Feb. 5, 1946.  F. W. SCHWINN  2,394,494
FOLDING BICYCLE FRAME
Filed March 13, 1944  2 Sheets-Sheet 1
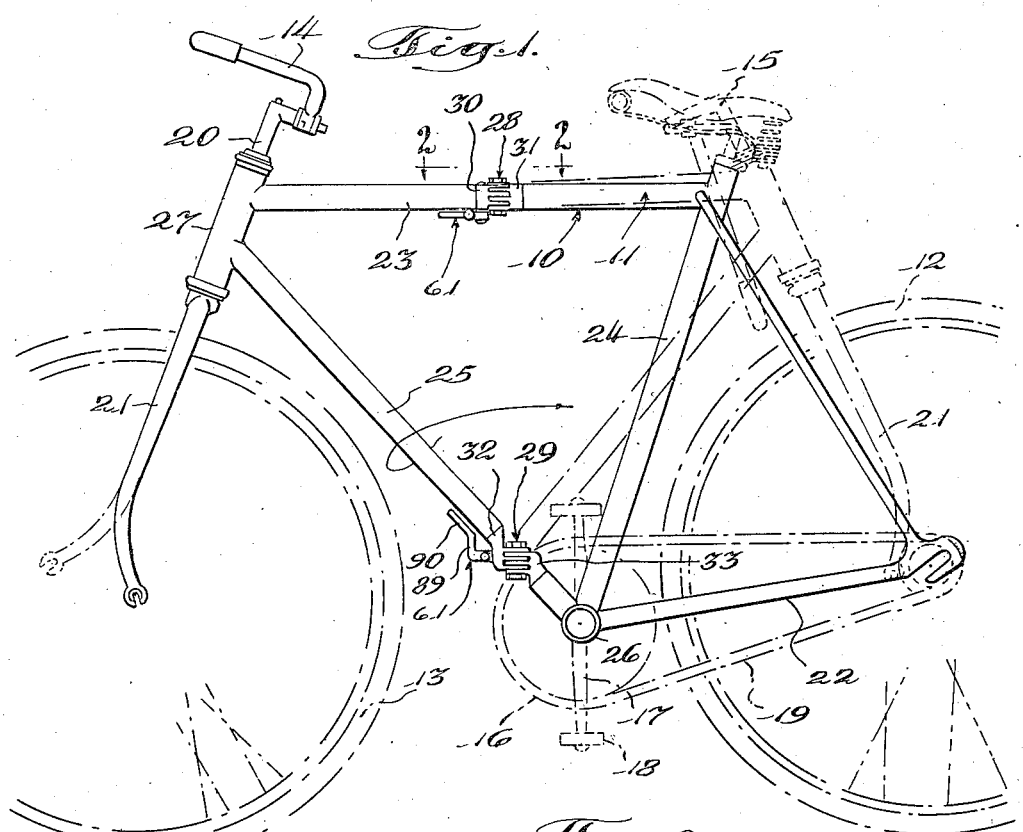
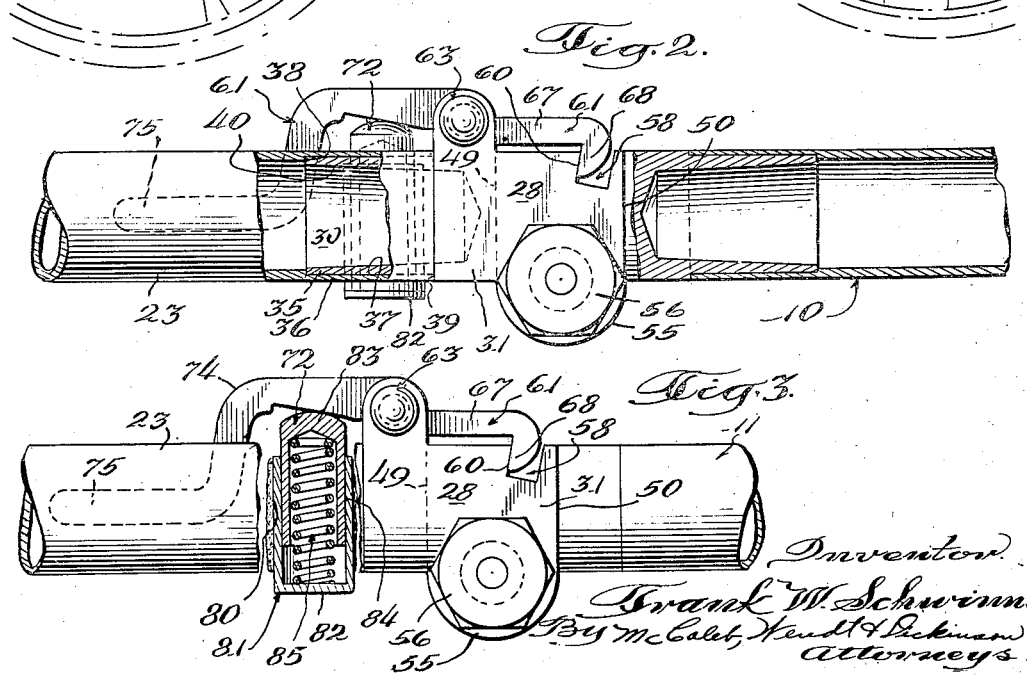

Feb. 5, 1946.　　F. W. SCHWINN　　2,394,494
FOLDING BICYCLE FRAME
Filed March 13, 1944　　2 Sheets-Sheet 2
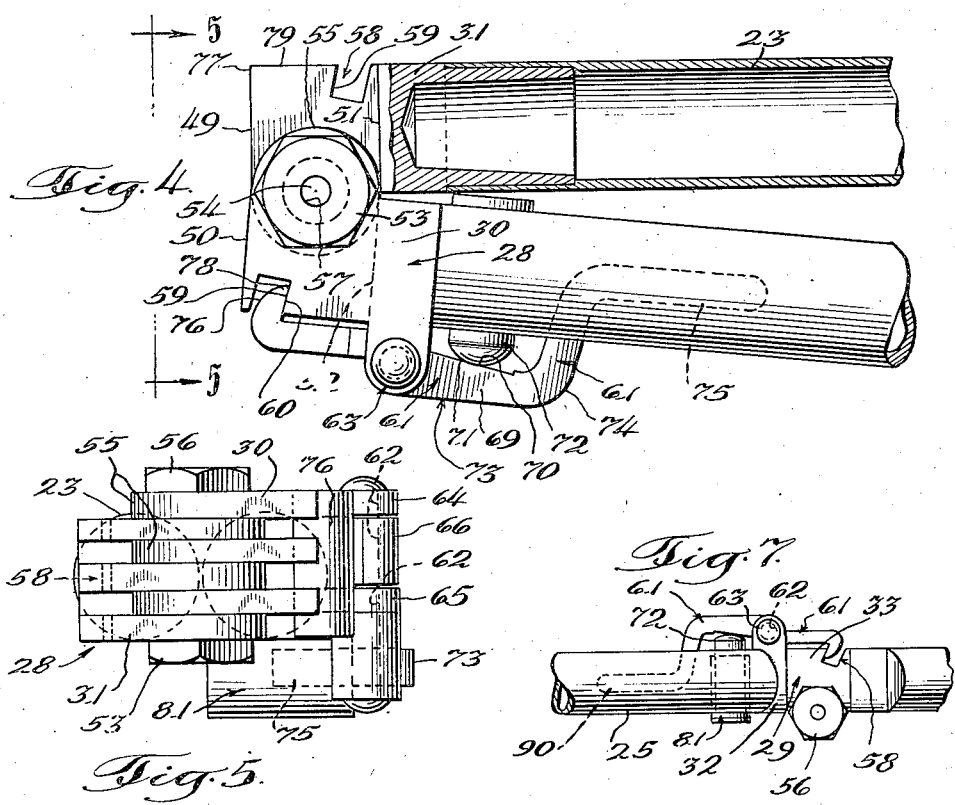
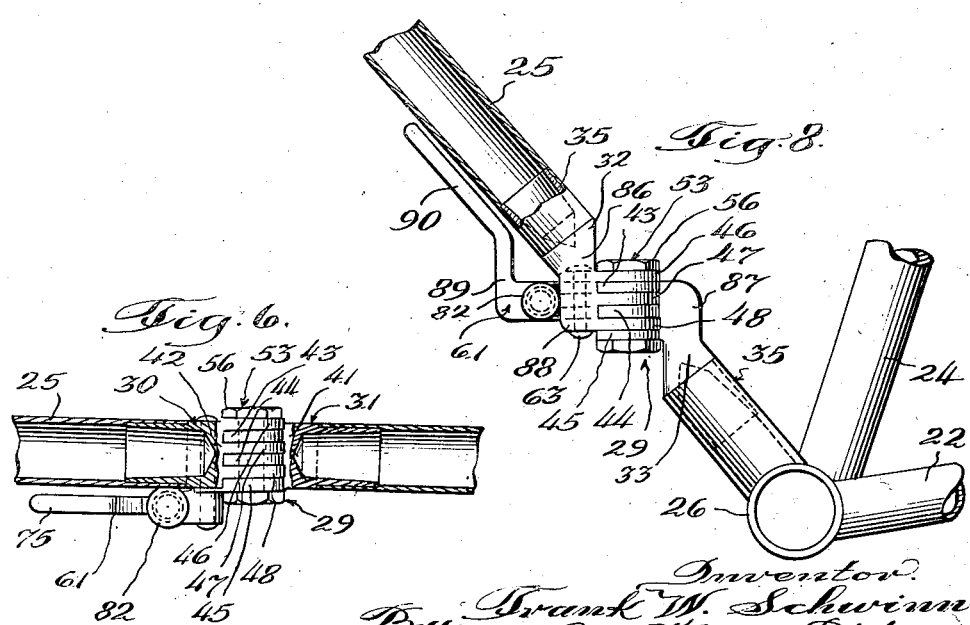
Inventor
Frank W. Schwinn
By McCaleb, Wendt & Dickinson
Attorneys Patented Feb. 5, 1946

2,394,494

UNITED STATES PATENT OFFICE 2,394,494

FOLDING BICYCLE FRAME

Frank W. Schwinn, Chicago, Ill.

Application March 13, 1944, Serial No. 526,179

14 Claims. (Cl. 287—99)

The present invention relates to folding bicycle frames, and while the present folding bicycle frame may be employed with advantage upon any bicycle, it is preferably used in connection with the folding bicycle cranks and folding bicycle handle bars covered by my copending applications.

One of the objects of the present invention is the provision of an improved frame joint which makes it possible to unfold the frame and put it into riding position almost instantaneously and which is characterized by the fact that the latching devices do not involve the screwing home of any threaded members nor the danger that would be involved with threaded members which were not securely tightened.

Another object of the invention is the provision of an improved joint for folding bicycle frames which is adapted to hold the parts of the frame with absolute rigidity when they are secured in the extended or operative position, and which is also adapted to be released with ease and readily moved to the folded position.

Another object of the invention is the provision of an improved folding bicycle frame the parts of which are held in extended position with absolute rigidity, but which is adapted to be folded with a minimum amount of effort into a folded position where it occupies a minimum amount of space and where its projecting parts overlap each other.

Another object of the invention is the provision of an improved folding bicycle frame which is provided with a plurality of jointed sections adjacent its middle portion so that the front and rear wheels may be moved into a position adjacent each other and which is so arranged that they are held in this position by movable jointed members in readiness for quick movement to the operative position, where they may be secured with absolute rigidity.

Another object of the invention is the provision of an improved folding joint for bicycle frames which is adapted to be so arranged that the folding parts of the frame are suitably spaced from each other so that projecting parts, such as the axles, etc., do not interfere with each other in the folded position.

Another object of the invention is the provision of an improved form of securing device for a bicycle frame joint which is provided with resilient means having a constant tendency to tighten the joint when it is in the riding position.

Other objects and advantages of the invention will be apparent from the following description and the accompanying drawings, in which similar characters of reference indicate similar parts throughout the several views.

Referring to the drawings, of which there are two sheets:

Fig. 1 is a side elevational view of a bicycle having a folding frame embodying the present folding frame joint;

Fig. 2 is a fragmentary top plan view of the upper joint, shown in partial section, the view being taken on the plane of the line 2—2 of Fig. 1;

Fig. 3 is a similar fragmentary view, with the spring pressed plunger shown in section;

Fig. 4 is a fragmentary top plan view in partial section, showing the parts of this joint in folded position;

Fig. 5 is an end elevational view of the folded joint of Fig. 4, taken on the plane of the line 5—5 of Fig. 4;

Fig. 6 is a fragmentary sectional view of the joint, with the tubes shown in section;

Fig. 7 is a fragmentary top plan view of the lower frame joint; and

Fig. 8 is a side elevational view of the lower frame joint.

Referring to Figs. 1 to 3, 10 indicates in its entirety the bicycle, with the folding frame, which is provided with all of the usual parts. The frame is indicated in its entirety by the numeral 11. 12 indicates the rear wheel, 13 the front wheel, 14 the handle bars, 15 the saddle, 16 the sprocket, 17 the cranks, 18 the pedals, 19 the chain, 20 the front steering post, 21 the front fork, and 22 the rear fork.

The frame 11 preferably includes the usual upper tube 23, the saddle post tube 24, and the lower front tube 25 which joins the crank hanger 26 to the steering post tube 27.

I desire it to be understood that the present invention may be utilized in bicycles of various types of construction, and that shown in the drawings is merely exemplary of one of the types of construction which is chosen for the purpose of illustration.

The present bicycles are preferably provided with a pair of the folding joints, one in the upper frame member 23, which is indicated by the numeral 28, and another in the lower frame member 25, which is indicated by the numeral 29.

In order to provide for the most compact folding of the bicycle frame and its parts, the joints 28, 29 are preferably located substantially midway between the front and rear axles and on a vertical line which is at right angles to a line extending from axle to axle and which is equidistant from the two axles.

In some embodiments of the invention, however, the exact position of the joint may be varied for the purpose of locating one axle slightly in advance of or beyond the other axle in the folded condition.

Each of the frame joints 28, 29 consists of a pair of metal fixtures preferably forged and suitably machined, such as the fixtures 30, 31, forming the joint 28, and 32, 33 forming the joint 29.

Each of the fixtures 30—33 is similar to the others in that they are all provided with the tubular shank portion 35 having a cylindrical outer surface 36 for engagement with the complementary inner cylindrical surface 37 in the frame tube with which they engage.

The frame tube should also have an annular shoulder 38, which the end of the tubular shank 35 engages, and the fixture has annular shoulder 39, which the end of the tube engages. These members may be secured together by means of a tight pressed frictional fit, or by welding, but they are preferably brazed into the frame tubes.

The shank 35 is preferably hollow, its bore being indicated by the numeral 40, and the bore may extend well into the fixture, provided a solid portion is left for the body 41 or 42 (Fig. 6), which supports the hinge plates 43—45 and 46—48.

The hinge plates 43—48 may be formed in each case by providing a forging having a solid body and by milling the forging straight across with a series of four cutters, forming the two necessary grooves, and machining the outside and inside of each hinge plate.

The grooves between the hinge plates on one body 41 are of sufficient size to receive the plates on the other body 42, and vice versa, with a tight rotating fit. The ends of the hinge plates are preferably straight, as indicated at 49, 50 in Fig. 4; and the bottoms 51, 52 of the grooves between the hinge plates are also plane surfaces so that each of the plates may be securely bottomed in the groove in the opposite fixture.

Since the hinge plates are provided with these plane end surfaces, it is necessary that the pintle, which comprises a hex head bolt 53, have its axis located at or beyond the side of the fixture, as, for example, the point 54 (Fig. 4); and therefore each fixture has its hinge plates and initially its body provided with a laterally projecting semicylindrical formation 55. This semicylindrical formation may be of approximately the same diameter as the relatively large head 56 of the bolt 53.

The hole 57 in all of the hinge plates 43—48 is preferably drilled through all of the hinge plates simultaneously when the fixture is in the riding position of Fig. 6, with the hinge plates all firmly bottomed in their respective grooves. Thus, when the joint is in the riding position, all of the hinge plates receive support from each other by virtue of the large flat surfaces and by virtue of the bottoming of each plate in the complementary groove between those of the opposite fixtures, and a joint of great rigidity and long resistance to wear is thus provided.

The two fixtures are prevented from going past center by the engagement of the edges of the hinge plates with the bottoms of the grooves; and since the grooves and hinge plates extend across the full surface of the fixture, there is ample surface to prevent the joint from wearing excessively.

The present frame joints are also preferably provided with a latching groove, indicated by the numeral 58; and the groove is preferably located in that edge of the plates which is opposite to the cylindrical protuberance 55. The groove may be of substantially rectangular cross section, but it preferably extends into the hinge plates 43—48 at an acute angle, and the latching surface 59 in the groove is preferably arranged at an angle which differs from that of the engaging surface 60 on the latching member 61 so that the latching member 61 does not initially move all the way into the groove 58, but it has a wedging engagement between the surfaces 59 and 60 and is adapted to take up the wear that may occur, by virtue of the latching member 61 being spring pressed into the position shown in Fig. 7.

Comparing the angularity of the surface 59 (Fig. 4) with that surface 60 on the lever 61, the surface 59 is at an angle which is slightly closer to a line that extends at right angles to the axis of the fixtures and tubes.

The latching lever 61 is preferably a bent forged lever which is pivotally mounted on one of the two fixtures, such as, for example, the fixture 50 and the fixture 32, and it is provided with a through bore 62 for receiving the lever pin 63 that may be riveted in place.

In order to provide for the pivotal support of this lever 61, the body 42 of the fixture 30 is provided with a pair of parallel bearing flanges 64, 65, which have aligned bores 62 and which are spaced sufficiently to receive the cylindrical bearing portion 66 of the lever 61, also having a through bore 62.

The lever has the latching end portion 67 extending from its bearing portion 66 on the side toward the location of the groove 58, and at this side the lever is preferably widened as shown in Fig. 5, so that its vertical depth is substantially equal to that of the assembly of the hinge plates 43—48.

Thus it is adapted to engage all of the hinge plates simultaneously and has a very wide engaging surface. At its extreme end the latching portion 67 is formed with the transverse lug or flange 68, having the engaging surface 60 previously described on the side toward the lever pin 63.

The portion of the latching lever 61 on the opposite side of the lever pin 63 extends axially of the fixture for a plunger-engaging portion 69, and is preferably provided with a plane surface 70 for engaging the partially spherical end 71 of a plunger 72. Between the lever pin 63 and the plunger 72, the lever 61 is preferably bent downward at 73 and laterally at 74 underneath the shank of the fixture so that the finger-engaging portion 75 preferably extends parallel to the tube with which the fixture is associated.

The outer surface 76 on the latching flange of the lever 61 is preferably curved to form a camming surface by means of which the lever may be cammed in a counterclockwise direction in Fig. 4 when the surface 76 engages the corners 77 of the hinge plates on the other fixture. Thus, when the frame is opened to the riding position, the surface 76 slidably engages the corners 77 and the latching lever 61 is cammed in a counterclockwise direction in Fig. 4, causing the plunger 72 to be retracted until the point 78 of the latching lever 61 rides over the side edges 79 of the hinge plates on the other fixture until it drops into the groove 58.

At that time all of the grooves in the hinge plates are in alignment, and the hinge plates are simultaneously latched in the riding position.

In order to support the plunger 72 (Fig. 3) the fixture which carries the latching lever 61 is provided with another lateral protuberance of sufficient size to be formed with a bore 80 for receiving the plunger assembly, the bore extending transversely to the axis of the fixture.

The plunger assembly preferably comprises a tubular housing member 81 of substantially cylindrical shape, which may have a pressed frictional fit in the bore 80 or may be brazed in place, and the housing 81 has one end 82 closed. In the opposite end of housing 81 there is slidably mounted the plunger 72, comprising another tubular metal member formed with a closed end wall 83.

The outer cylindrical surface 84 of the plunger 72 slidably engages the inner cylindrical surface 20 in the housing 81. A helical coil spring 85 engages the bottom 82, and the end wall 83 of the plunger 72, and is initially compressed so that it urges the plunger outward into engagement with the latching lever 61 to urge the latching lever into latching position.

The fixtures 32 and 33 of the lower frame joint 29 are constructed substantially the same as the upper frame joint 28, except that, since the two pintle bolts of the hinges must have their axes in alignment, the lower joint 29 has its fixtures provided with offset bodies 86, 87.

Thus the body 86 extends downwardly in Fig. 8 at an obtuse angle to the axis of the tubular shank 35, and the hinge plates 46—48 extend at substantially right angles to the downwardly extending portion 88 of the fixture 86.

The lever pin 63 again extends parallel to the hex head bolt 53, and the latching lever 61 is bent laterally at 89 so that its end portion 90 extends parallel to and underneath the tube 25.

The fixture 87 extends upwardly at an obtuse angle to the axis of the lower tubular shank 35, and its hinge plates 43—45 extend horizontally at right angles to the upwardly extending part of the body portion 87.

In this case also the axis of the hex head bolt 53 is, of course, located substantially at the side of both fixtures in the edge of the semi-cylindrical portion 55 of the two fixtures.

The operation of the present folding frame is as follows: To fold the bicycle it is only necessary to press on both the latching levers 61 until they are unlatched, and then to exert sufficient pressure on the frame to fold it from the full line position of Fig. 1 to the dotted line position.

To unfold the bicycle and place it in riding condition, it is only necessary to move the frame from the position of Fig. 4 to that of Fig. 6; that is, from the dotted line position of Fig. 1 to the full line position; and when sufficient pressure is exerted, to securely bottom the hinge plates in their respective grooves, the latching grooves 58 in these hinge plates will come into alignment, and the latching levers 61 will be moved into the latching position by the plungers 72.

Thereupon the frame is securely held in its unfolded and riding position. It will be evident that the latching of the frame in riding position is automatic, requiring no further attention on the part of the operator.

This is of marked advantage over the devices of the prior art, in which there may be threaded members or other securing devices that have to be screwed home or moved manually into the securing position because the latter operations require a considerable amount of time.

Furthermore, there is always the danger in the devices of the prior art that the bolts or other fastening devices will not be securely tightened.

According to the present invention, any such manual tightening of the securing devices is completely eliminated; and the spring pressed plungers have the capability of constantly tending toward the tightening of the joint.

Therefore, the present folding frames are peculiarly adapted to be opened and automatically secured in tight, non-rattling open position in the dark, or in any emergency, without particular attention on the part of the operator.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A hinge joint for folding bicycle frames, comprising a pair of joint fixtures, each of said joint fixtures being provided with an attaching portion adapted to be secured to the tubular parts of the frame, and each of said fixtures being formed with a multiplicity of parallel hinge plates, the hinge plates of each fixture being spaced sufficiently to receive the hinge plates of the other fixture with a tight sliding fit, said hinge plates being formed at one side with a bearing portion and provided with a pintle extending through the bearing portions of said hinge plates, and said hinge plates being formed with plane end surfaces adapted to be bottomed in complementary grooves between the hinge plates on the opposing fixture, and automatic latching means for holding said hinge plates in the unfolded position.

2. A hinge joint for folding bicycle frames, comprising a pair of joint fixtures, each of said joint fixtures being provided with an attaching portion adapted to be secured to the tubular parts of the frame, and each of said fixtures being formed with a multiplicity of parallel hinge plates, the hinge plates of each fixture being spaced sufficiently to receive the hinge plates of the other fixture with a tight sliding fit, said hinge plates being formed at one side with a bearing portion and provided with a pintle extending through the bearing portions of said hinge plates, and said hinge plates being formed with plane end surfaces adapted to be bottomed in complementary grooves between the hinge plates on the opposing fixture, and automatic latching means for holding said hinge plates in the unfolded position, said latching means including a spring pressed latching member; and a latching surface formed on all of said hinge plates for simultaneous engagement with said latching means.

3. A hinge joint for folding bicycle frames, comprising a pair of joint fixtures, each of said joint fixtures being provided with an attaching portion adapted to be secured to the tubular parts of the frame, and each of said fixtures being formed with a multiplicity of parallel hinge plates, the hinge plates of each fixture being spaced sufficiently to receive the hinge plates of the other fixture with a tight sliding fit, said hinge plates being formed at one side with a bearing portion and provided with a pintle extending through the bearing portions of said hinge plates, and said hinge plates being formed with plane end surfaces adapted to be bottomed in complementary grooves between the hinge plates on the opposing fixture, and automatic latching means for holding said hinge plates in the unfolded position, said latching means including a spring pressed latching member, and a latching surface formed on all of said hinge plates for simultaneous engagement with said latching means, said latching means comprising a pivoted lever movable into a groove in the latching plates having said latter surface as one of its sides.

4. A hinge joint for folding bicycle frames, comprising a pair of joint fixtures, each of said joint fixtures being provided with an attaching portion adapted to be secured to the tubular parts of the frame, and each of said fixtures being formed with a plurality of hinge plates, the hinge plates of each fixture being spaced sufficiently to receive the hinge plates of the other fixture, said hinge plates being formed at one side with a bearing portion and provided with a pintle extending through the bearing portions of said hinge plates, and said hinge plates being formed with plane end surfaces adapted to be bottomed in complementary grooves between the hinge plates on the opposing fixture, and automatic latching means for holding said hinge plates in the unfolded position, said latching means including a spring pressed latching member, and a latching surface formed on all of said hinge plates for simultaneous engagement with said latching means, said latching means comprising a pivoted lever movable into a groove in the latching plates having said latter surface as one of its sides, and said latching lever having upon its leading end a camming surface adapted to move the latching lever out of latching position during the unfolding of the frame members so that it may spring into latching position automatically when the frame members reach the unfolded position.

5. A hinge joint for folding bicycle frames, comprising a pair of joint fixtures, each of said joint fixtures being provided with an attaching portion adapted to be secured to the tubular parts of the frame, and each of said fixtures being formed with a plurality of hinge plates, the hinge plates of each fixture being spaced sufficiently to receive the hinge plates of the other fixture, said hinge plates being formed at one side with a bearing portion and provided with a pintle extending through the bearing portions of said hinge plates, and said hinge plates being formed with plane end surfaces adapted to be bottomed in complementary grooves between the hinge plates on the opposing fixture, and automatic latching means for holding said hinge plates in the unfolded position, said latching means including a spring pressed latching member, and a latching surface formed on all of said hinge plates for simultaneous engagement with said latching means, said latching means comprising a pivoted lever movable into a groove in the latching plates having said latter surface as one of its sides, and said latching lever extending downwardly and laterally with respect to the adjacent tubular frame member so that it may have its actuating end located alongside the said tubular frame member.

6. In a folding frame joint for bicycles, the combination of a pair of folding fixtures, each fixture having a tubular shank for securement to a tubular bicycle frame member, and each fixture being provided with a body portion, the said body portions each being provided with a multiplicity of parallel hinge plates, and the hinge plates in each fixture being spaced from each other by a distance adapted to form a groove for receiving the hinge plates of the other fixture with a tight sliding fit, all of said hinge plates being formed with a laterally extending bearing portion provided with a through bore in all the hinge plates, the axis of said bore being located beyond the sides of the bodies of said fixtures, and said hinge plates being formed with substantially rectangular ends adapted to be bottomed squarely against complementary surfaces in the grooves between the hinge plates on the opposite fixture, all of said hinge plates being formed on one side with latching grooves which come into alignment when the hinge plates are securely bottomed in their respective grooves of the opposite fixture, one of said fixtures being also formed with a pair of hinge flanges for supporting a pin, and said pin supporting a latching lever, said latching lever having a latching portion adapted to extend into all of said latching grooves simultaneously to hold the joint in open position.

7. In a folding frame joint for bicycles, the combination of a pair of folding fixtures, each fixture having a tubular shank for securement to a tubular bicycle frame member, and each fixture being provided with a body portion, the said body portions each being provided with a plurality of hinge plates, and the hinge plates in each fixture being spaced from each other by a distance adapted to form a groove for receiving the hinge plates of the other fixture, all of said hinge plates being formed with a laterally extending bearing portion provided with a through bore in all the hinge plates, the axis of said bore being located beyond the sides of the bodies of said fixtures, and said hinge plates being formed with substantially rectangular ends adapted to be bottomed squarely against complementary surfaces in the grooves between the hinge plates on the opposite fixture, all of said hinge plates being formed on one side with latching grooves which come into alignment when the hinge plates are securely bottomed in their respective grooves of the opposite fixture, one of said fixtures being also formed with a pair of hinge flanges for supporting a pin, and said pin supporting a latching lever, said latching lever having a latching portion adapted to extend into all of said grooves simultaneously to hold the joint in open position, the said latter fixture also having a laterally projecting body portion for supporting a spring pressed plunger, and a spring pressed plunger engaging said latching lever to urge it to the latching position.

8. In a folding frame joint for bicycles, the combination of a pair of folding fixtures, each fixture having a tubular shank for securement to a tubular bicycle frame member, and each fixture being provided with a body portion, the said body portions each being provided with a plurality of hinge plates, and the hinge plates in each fixture being spaced from each other by a distance adapted to form a groove for receiving the hinge plates of the other fixture, all of said hinge plates being formed with a laterally extending bearing portion provided with a through bore in all the hinge plates, the axis of said bore being located beyond the sides of the bodies of said fixtures, and said hinge plates being formed with substantially rectangular ends adapted to be bottomed squarely against complementary surfaces in the grooves between the hinge plates on the opposite fixture, all of said hinge plates being formed on one side with latching grooves which come into alignment when the hinge plates are securely bottomed in their respective grooves of the opposite fixture, one of said fixtures being also formed with a pair of hinge flanges for supporting a pin, and said pin supporting a latching lever, said latching lever having a latching portion adapted to extend into all of said grooves simultaneously to hold the joint in open position, said latching grooves and said latching lever being formed with their engaging latching surfaces at a slight angle to each other whereby the latching lever may be urged into tighter latching engagement to hold the hinge plates in tight nonrattling engagement with each other.

9. In a folding frame joint for bicycles, the combination of a pair of folding fixtures, each fixture having a tubular shank for securement to a tubular bicycle frame member, and each fixture being provided with a body portion, the said body portions each being provided with a plurality of hinge plates, and the hinge plates in each fixture being spaced from each other by a distance adapted to form a groove for receiving the hinge plates of the other fixture, all of said hinge plates being formed with a laterally extending bearing portion provided with a through bore in all the hinge plates, the axis of said bore being located beyond the sides of the bodies of said fixtures, and said hinge plates being formed with substantially rectangular ends adapted to be bottomed squarely against complementary surfaces in the grooves between the hinge plates on the opposite fixture, all of said hinge plates being formed on one side with latching grooves which come into alignment when the hinge plates are securely bottomed in their respective grooves of the opposite fixture; one of said fixtures being also formed with a pair of hinge flanges for supporting a pin, and said pin supporting a latching lever, said latching lever having a latching portion adapted to extend into all of said grooves simultaneously to hold the joint in open position, the said latter fixture also having a laterally projecting body portion for supporting a spring pressed plunger, and a spring pressed plunger engaging said latching lever to urge it to the latching position, said spring pressed plunger comprising a pair of telescoping tubular members housing a compression spring.

10. In a folding bicycle, a bicycle frame having an upper substantially horizontally extending tubular frame member and a lower forward and diagonally upwardly extending frame member, each of said frame members being provided with a pair of frame joint members separating the upper and the lower frame member each into two separately movable portions, said fixtures being provided with separate pintles located on substantially the same axis and located with their axis at substantially the sides of the tubular frame members, the said joints each comprising a plurality of hinge plates spaced from each other in each fixture by grooves of sufficient width to receive the hinge plates on the opposite fixture, and all the hinge plates being provided with aligned latching grooves, and separate automatic latching means carried by each joint and spring pressed into the latching position for simultaneous engagement in all of the latching grooves of the hinge plates of each joint respectively when the joints are moved to the riding position.

11. In a folding bicycle, a bicycle frame having an upper substantially horizontally extending tubular frame member and a lower forward and diagonally upwardly extending frame member, each of said frame members being provided with a pair of frame joint members separating the upper and the lower frame member each into two separately movable portions, said fixtures being provided with separate pintles located on substantially the same axis and located with their axis at substantially the sides of the tubular frame members, the said joints each comprising a plurality of hinge plates spaced from each other in each fixture by grooves of sufficient width to receive the hinge plates on the opposite fixture, and all the hinge plates being provided with aligned latching grooves, and separate automatic latching means carried by each joint and spring pressed into the latching position for simultaneous engagement in all of the latching grooves of the hinge plates of each joint respectively when the joints are moved to the riding position, said latching means comprising a lever pivoted on the upper joint and another on the lower joint, the said lever being provided with a latching surface of slightly different angularity than the surfaces of the latching grooves which it engages whereby the lever is in wedging engagement with the latching surface to constantly urge the joint parts into tighter engagement.

12. In a folding bicycle, a bicycle frame having an upper substantially horizontally extending tubular frame member and a lower forward and diagonally upwardly extending frame member, each of said frame members being provided with a pair of frame joint members separating the upper and the lower frame member each into two separately movable portions, said fixtures being provided with separate pintles located on substantially the same axis and located with their axis at substantially the sides of the tubular frame members, the said joints each comprising a plurality of hinge plates spaced from each other in each fixture by grooves of sufficient width to receive the hinge plates on the opposite fixture, and all the hinge plates being provided with aligned latching grooves, and separate automatic latching means carried by each joint and spring pressed into the latching position for simultaneous engagement in all of the latching grooves of the hinge plates of each joint respectively when the joints are moved to the riding position, said latching means comprising a lever pivoted on the upper joint and another on the lower joint, the said lever being provided with a latching surface of slightly different angularity than the surfaces of the latching grooves which it engages whereby the lever is in wedging engagement with the latching surface to constantly urge the joint parts into tighter engagement, said latching levers each being engaged by a spring pressed plunger carried by the adjacent fixture to urge the latching levers into latching position.

13. In a folding bicycle, a bicycle frame having an upper substantially horizontally extending tubular frame member and a lower forward and diagonally upwardly extending frame member, each of said frame members being provided with a pair of frame joint members separating the upper and the lower frame member each into two separately movable portions, said fixtures being provided with separate pintles located on substantially the same axis and located with their axis at substantially the sides of the tubular frame members, the said joints each comprising a plurality of hinge plates spaced from each other in each fixture by grooves of sufficient width to receive the hinge plates on the opposite fixture, and all the hinge plates being provided with aligned latching grooves, and separate automatic latching means carried by each joint and spring pressed into the latching position for simultaneous engagement in all of the latching grooves of the hinge plates of each joint respectively when the joints are moved to the riding position, said latching means comprising a lever pivoted on the upper joint and another on the lower joint, the said lever being provided with a latching surface of slightly different angularity than the surfaces of the latching grooves which it engages whereby the lever is in wedging engagement with the latching surface to constantly urge the joint parts into tighter engagement, said latching levers each being engaged by a spring pressed plunger carried by the adjacent fixture to urge the latching levers into latching position, the said latching levers being provided with curved camming surfaces on their leading ends for engagement with the opposite hinge plates to move the latching lever backwards so that it may automatically snap into latching position when the grooves in the hinge plates come into alignment.

14. A hinged joint for foldable frame members, comprising a pair of joint fixtures, each of said joint fixtures being provided with an attaching portion adapted to be secured to a frame member, and each of said fixtures being formed with a multiplicity of parallel hinge plates, the hinge plates of each fixture being spaced sufficiently to receive the hinge plates of the other fixture with a tight sliding fit, said hinge plates being formed at one side with a bearing portion and provided with a pintle extending through the bearing portions of the hinge plates, and said hinge plates being formed with plane end surfaces adapted to be bottomed against complementary surfaces at the base of the spaces between the hinge plates of the opposing fixture, whereby the joint is substantially rigid when the hinge plates are in tight bottomed engagement with each other.

FRANK W. SCHWINN.